Figure 1:
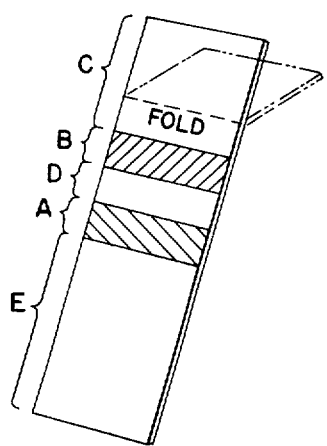

United States Patent [19]

Campbell

[11] 3,893,808

[45] July 8, 1975

[54] METHOD AND PAPER TEST STRIP FOR DETERMINING LOW LEVELS OF LEAD IN HYDROCARBON FUELS

[75] Inventor: Ralph L. Campbell, Brecksville, Ohio

[73] Assignee: Standard Oil Company, Cleveland, Ohio

[22] Filed: Sept. 20, 1974

[21] Appl. No.: 504,606

Related U.S. Application Data

[63] Continuation-in-part of Ser. No. 372,863, June 22, 1973, abandoned.

[52] U.S. Cl............................................. 23/253 TP
[51] Int. Cl...................... G01n 31/22; G01n 33/22
[58] Field of Search .......... 23/253 TP; 116/114 AM

[56] References Cited
UNITED STATES PATENTS

| | | | |
|---|---|---|---|
| 3,071,446 | 1/1963 | Snyder et al...................... | 23/232 R |
| 3,453,081 | 7/1969 | Walker............................. | 23/232 R |
| 3,843,325 | 10/1974 | Schmitt et al.............. | 23/253 TP X |

*Primary Examiner*—Robert M. Reese
*Attorney, Agent, or Firm*—John F. Jones; Sherman J. Kemmer; Evelyn R. Kosman

[57] ABSTRACT

Test method suitable for field testing for lead contamination in unleaded motor fuels, and chemically-treated paper test strip utilized in the testing procedure.

The test method comprises contacting a sample of motor fuel with a strip of paper that has been pre-treated in separate zones with a solution of iodine and a solution of a mixture of iodine and potassium iodide. The organic lead compound present in the sample is then identified by the appearance of a red coloration on the paper test strip with the application of a few drops of dithizone indicator solution to the paper.

17 Claims, 4 Drawing Figures

METHOD AND PAPER TEST STRIP FOR DETERMINING LOW LEVELS OF LEAD IN HYDROCARBON FUELS

This application is a continuation-in-part of co-pending patent application Ser. No. 372,863, filed June 22, 1973 and now abandoned.

This invention relates to a test method for determining the presence of trace amounts of lead in hydrocarbon fuels. More particularly, this invention relates to a test procedure that is suitable for field testing for lead contamination in unleaded motor fuels, and to the chemically-treated paper test strip utilized in the testing procedure.

Because of the recent emphasis placed on goals toward converting to lead-free motor fuels as a result of the more rigid environmental controls, it is becoming increasingly important to service station personnel to be able to detect lead contamination in lead-free motor fuels. The test method described in the present invention is directed toward satisfying the need for a simple, rapid, reliable field test for the presence of trace amounts of organic lead, usually in the form of lead alkyls, such as tetraethyl lead and tetramethyl lead, in hydrocarbon fuels. The method herein described can be completed in the field within about 15 to 20 minutes with a minimum of time and attention being required by the operator. Other advantages associated with the test method are that the method does not require the handling of hazardous chemicals or the use of specialized equipment; it can be employed either as a qualitative or semiquantitative method for the detection of lead, and lead concentrations as low as 0.02 grams per U.S. gallon of motor fuel can be detected by this procedure.

In accordance with the present invention, a sample of motor fuel is contacted with a strip of paper that has been pre-treated in separate zones with an alcoholic solution of iodine and an aqueous solution of a mixture of iodine and potassium iodide. Any organic lead present in the fuel sample is converted to inorganic lead iodide on the surface of the paper, and the lead is then identified by the red coloration of a lead dithizonate complex that develops on the paper with the application of a few drops of a solvent solution of dithizone indicator to the paper.

The basic iodine-dithizone method for the determination of alkyl lead is well known, and most dithizonate methods are generally carried out in aqueous solution requiring the application of heat or ultraviolet light to complete the iodine-alkyl lead reaction, followed by precise control of pH during color development. What is surprising in the present invention is that the organic lead is converted to lead iodide on the paper test strip without the need for heat, an ultraviolet lamp or the use of cyanide buffers to control pH.

Although this test method is applicable to a variety of refinery streams such as distillate fuels, it is particularly applicable to motor fuels and aviation fuels to which alkyl lead compounds are normally added.

More specifically, the test method of this invention will become more apparent from the following detailed description taken in conjunction with the accompanying drawings. Four possible variations of the test strip which can be utilized satisfactorily in the present test method are illustrated in FIGS. 1 to 4. The proportions of the chemically treated areas to the untreated areas of the paper test strip are not critical, and it is therefore not to be construed that these areas are limited to those proportions indicated in the drawings.

In one specific embodiment of this invention, the paper test strip shown in FIG. 1 can be prepared and utilized in the testing procedure in the following manner:

1. A strip of paper is first treated by applying an alcoholic solution of iodine across a narrow zone of the paper at A some distance from the lower edge, using a means, as for example a syringe, to apply the solution to the test strip.

2. An aqueous solution of a mixture of iodine and potassium iodide is then applied to a second zone at B at a distance from the upper edge of the test strip, allowing untreated areas C, D and E to remain between and adjacent to the two chemically-treated zones A and B. The treated paper test strip is then allowed to dry completely before coming in contact with the fuel sample.

3. The untreated area E at the lower edge of the paper test strip is then dipped into the fuel sample for a period of from about 5 minutes to about one hour, in the presence of natural daylight or artificial daylight containing some ultraviolet light. The required reaction time varies with the size of the fuel sample employed, the larger the sample, the shorter the reaction time required. Care should also be exercised that none of the fuel comes into contact with the chemically treated zones A and B of the paper. The test strip is then removed from the fuel sample and allowed to dry.

4. Several drops of an organic solvent solution of dithizone indicator are then applied to the untreated area at the upper edge of the test strip at C. The development of a pink or red coloration within a period of about 10 seconds to 5 minutes is indicative of a lead content of at least 0.05 grams per gallon of fuel. The color begins to fade after about 5 minutes or less. No color development or the development of a pale orange color indicates the presence of less than about 0.05 grams of lead per gallon of sample.

Figure 2:
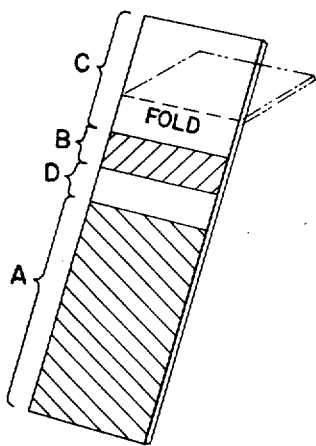

In an alternate embodiment of this invention, a test strip shown in FIG. 2 may be utilized in the same manner as described above. For convenience in preparation of the test strip, reagent zone A containing the iodine may be extended to the bottom edge of the paper strip, whereby the untreated zone E is eliminated. In such instance the fuel sample is allowed to contact only a portion of zone A, leaving an area of zone A uncontacted by the fuel sample.

Figure 3:
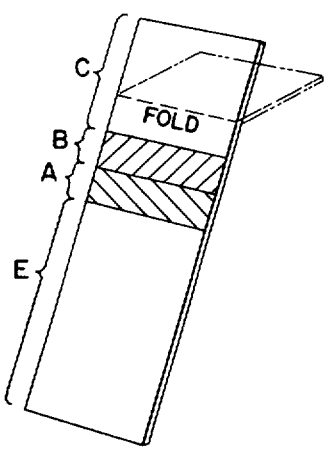

In a further variation of the test strip, as shown in FIG. 3, reagent zones A and B may be contiguous, thus eliminating the untreated zone D between the two chemically-treated zones. For reliable results, however, care should be taken to avoid overlapping of zones A and B.

Figure 4:
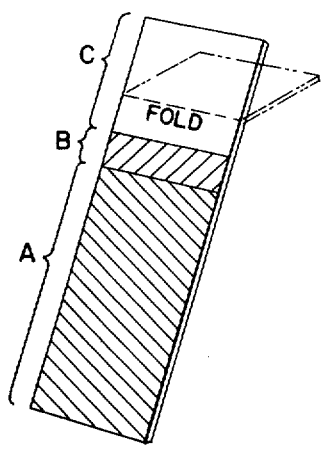

In still another variation which is a combination of the embodiments shown in FIGS. 2 and 3, the zones A and B are contiguous and zone A extends to the bottom edge of the paper test strip, thereby eliminating untreated zones D and E. This modification is illustrated in FIG. 4.

A semiquantitative estimate of the amount of lead present in a fuel sample may be obtained by visually comparing the intensity of color development with a standard dithizone color guide for various levels of lead in gasoline samples. For example, distinct differences in color intensity can be observed for ranges of lead concentration below about 0.02 grams per gallon, from about 0.02 – 0.05 grams per gallon and from about 0.05 to 0.08 grams per gallon, and so on. In instances where no lead is present in the fuel sample, no color change of the indicator is observed. To insure accurate color comparisons, it is advisable to test a standard fuel sample containing 0.05 grams of lead per gallon along with the test sample.

The paper employed for the test strips in this invention is preferably a smooth-textured paper low in organic and inorganic impurities, and having uniform physical characteristics. Preferably, the paper is composed of cellulose, and most preferably it is composed of a commercial grade of cellulosic chromatographic paper especially manufactured for chromatography. Examples of suitable papers include Whatman thin layer chromatographic papers such as Whatman Nos. 2 to 4, and papers available from Schleicher-Schull Co. of New Hampshire, as for example, Grade 2040 A. Although chromatographic paper is especially preferred for purposes of convenience, any cellulosic-type paper having the above characteristics may be cut into strips of suitable size and utilized satisfactorily in the same manner.

For most accurate test results, it is desirable that the chemicals employed in the test procedure be lead-free, reagent grade. Neither the concentrations of the reagents employed nor the timing involved in each step of the test are critical. However, sufficient amounts of reagent should be present in the solutions to completely react with all of the lead present in the fuel sample, and not so great an excess should be present so as to interfere with the desired reaction.

In preparing the iodine reagent, any lower molecular weight alcohol may be used as a solvent, however, methanol is preferred because of its ready availability and low cost.

The organic solvent employed for the solution of the dithizone indicator is preferably a halogenated hydrocarbon such as, chloroform, methylchloride, methylene chloride, carbon tetrachloride, perchloroethylene, and the like. Most preferred for this purpose, however, are chloroform, methylene chloride, and carbon tetrachloride.

In this test procedure, the factors of time, dimensions of the paper test strip and fuel sample size are interdependent, so that any one of these factors may be varied over a wide range without departing from the original spirit of the invention.

The chemically-treated paper test strips prepared as hereinbefore described will remain stable for at least a period of about six months, so that pre-prepared test strips can be used by the service station personnel for purposes of convenience and conservation of time. The preparation of the paper test strips and the testing procedure contemplated in this invention can be more readily understood from the following specific examples. These examples, however, are set forth primarily for the purpose of illustration and are not to be interpreted as limitations of the invention.

EXAMPLE I

Reagents 1. 0.2 N Iodine in methanol
2. 2.0 N Aqueous iodine-potassium iodide solution
3. Dithizone indicator (diphenylthiocarbazone $C_6H_5N:N.CS.NH.NHC_6H_5$), 0.010 grams in 100 mls. of chloroform.

A strip of chromatographic paper, (Carl Schleicher and Schüll Co., Keene, New Hampshire; Grade 2040 A) characterized as a fast-flow, smooth surface paper and having the dimensions 2½ inches × ¾ inch, was folded ⅜ inch from one end. This folded end will henceforth be referred to as the upper end or the top of the paper test strip. Employing a syringe, a narrow stripe, ¼ inch in width, of iodine solution (reagent 1) was applied across the paper strip approximately ¾ inch from the bottom edge. A second narrow stripe of iodine-potassium-iodide solution (reagent 2), about ¼ inch in width, was applied at approximately 1 inch to 1¼ inches from the lower edge of the paper strip. The chemically treated paper test strip was then allowed to dry completely for about 30 minutes before contacting it with the motor fuel sample.

In the laboratory under fluorescent lighting, the dried paper test strip was placed in a glass jar containing 5 mls. of a fuel sample. The upper end of the strip (folded end) was placed under the jar top and the lower untreated zone of the strip was immersed in the fuel sample for about one hour. Care was taken to avoid contact of the sample with the chemically treated areas of the paper strip. The paper strip was then removed from the fuel sample and allowed to dry.

Using a glass dropper, 3 drops of the dithizone solution (reagent 3) were applied to the untreated area of the paper strip just below the fold. After a period of about 10 seconds to 1 minute a light red color developed. On comparing the color with a standardized color guide given below, a lead content for the sample of equal to or greater than 0.05 grams per gallon of fuel was indicated.

| Color Guide | | |
|---|---|---|
| Lead conc. g/gal. | Within 10 seconds | Within 60 seconds |
| 0 to < .02 | Light green | Pale yellow-orange |
| .02 to .05 | Light green, light yellow-orange edge | Medium yellow-orange |
| > .05 | Light green, pink edge | Pink to red |

EXAMPLE II

The reagents employed in this example were the same as those employed in Example I.

A strip of chromatographic paper, (Carl Schleicher & Schüll Co., June, New Hampshire; Grade 2040 A) as in Example I, having the dimensions 2½ inches × ¾ inch was folded ⅜ inch from one end (henceforth referred to as the upper end of the paper strip). A narrow stripe approximately ¼ inch in width of iodine reagent (reagent 1) was applied across the paper 1¼ inches from the bottom edge. A second stripe, also about ¼ inch in width of iodine-potassium iodide reagent (reagent 2) was placed across the paper strip approximately ½ inch from the upper edge of the paper and approximately ¼ inch from the first reagent stripe, leaving an untreated area of about ¼ inch in width between the two reagents. The chemically treated paper test strip was then allowed to dry completely for 30 minutes before contacting it with the motor fuel sample.

The test procedure was again carried out in the laboratory under fluorescent lighting. As in Example I, the paper test strip was placed in a glass beaker containing 25 mls. of fuel sample, and the beaker was covered with a watch glass. The bottom edge of the strip was immersed in the fuel, while the folded upper edge rested against the beaker wall. After a period of 5 minutes the strip was removed from the sample, placed across the watch glass, and was allowed to dry for 10 minutes. A drop of dithizone indicator was then placed on the folded end of the test strip. Within a period of 60 seconds a light red color developed, indicating the presence of lead in amounts of 0.05 grams per gallon or more.

I claim:

1. In a method for determining the presence of organic lead compounds in hydrocarbon fuels wherein the organic lead is reacted with iodine to form lead iodide and the lead iodide is subsequently reacted with dithizone to form a colored lead dithizonate when extracted into an organic solvent, the improvement comprising: contacting said organic lead-containing hydrocarbon fuel with a strip of chemically treated paper, said paper strip having at least three distinct separate zones, A through C, wherein Zone A is treated with iodine;

Zone B is treated with a mixture of iodine and potassium iodide; and

Zone C is an untreated area adjacent to Zone B;

whereon contacting said hydrocarbon fuel with the paper test strip, the organic lead compounds in the fuel by means of capillary action are reacted in sequence at Zone A and then at Zone B to form lead iodide, and the lead iodide thusly formed is converted to characteristically colored lead dithizonate in Zone C of the paper strip by applying to Zone C a solution of dithizone in an organic solvent.

2. The method in claim 1 wherein the organic lead compound is present in the hydrocarbon fuel as lead alkyl.

3. The method in claim 2 wherein the paper test strip is composed of cellulose.

4. The method in claim 3 wherein the test procedure is carried out in the presence of light containing some ultraviolet light.

5. The method in claim 4 wherein the iodine in Zone A is applied to the paper strip as a solution in alcohol.

6. The method in claim 5 wherein the alcohol is methanol.

7. The method in claim 6 wherein the iodine-potassium iodide mixture in Zone B is applied to the paper test strip as an aqueous solution of iodine and potassium iodide.

8. The method in claim 7 wherein the dithizone indicator is applied to the paper test strip as a solution in a halogenated hydrocarbon solvent.

9. The method in claim 8 wherein the halogenated hydrocarbon solvent is chloroform.

10. The method in claim 9 wherein the paper test strip has a second untreated zone positioned between Zones A and B.

11. The method in claim 9 wherein the paper test strip has a second untreated zone adjacent to Zone A.

12. The method in claim 10 wherein the paper test strip has a third untreated zone positioned between zones A and B.

13. A paper test strip for use in determining the presence of organic lead compounds in hydrocarbon fuels as lead dithizonate, said paper strip comprising a chemically treated paper having at least three distinct separate zones, A through C, and wherein:

Zone A is treated with iodine;

Zone B is treated with a mixture of iodine and potassium iodide; and

Zone C is an untreated area adjacent to Zone B.

14. The paper test strip in claim 13 wherein the paper is composed of cellulose.

15. The paper test strip in claim 13 wherein a second untreated zone is positioned between Zones A and B.

16. The paper test strip in claim 13 wherein a second untreated zone is positioned adjacent to Zone A.

17. The paper test strip in claim 16 wherein a third untreated zone is positioned between zones A and B.

* * * * *